(12) United States Patent
Asai et al.

(10) Patent No.: US 10,412,260 B2
(45) Date of Patent: Sep. 10, 2019

(54) IMAGE FORMING APPARATUS, ERROR PREVENTING METHOD FOR THE SAME, AND RECORDING MEDIUM

(71) Applicant: KONICA MINOLTA, INC., Chiyoda-ku, Tokyo (JP)

(72) Inventors: Shinichi Asai, Gamagori (JP); Kenichi Komaba, Toyokawa (JP); Shoko Haba, Toyokawa (JP); Yu Sonoda, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/623,701

(22) Filed: Jun. 15, 2017

(65) Prior Publication Data
US 2017/0366698 A1    Dec. 21, 2017

(30) Foreign Application Priority Data

Jun. 17, 2016 (JP) ................................. 2016-120903

(51) Int. Cl.
*H04N 1/32* (2006.01)
*H04N 1/00* (2006.01)

(52) U.S. Cl.
CPC ....... *H04N 1/3263* (2013.01); *H04N 1/00015* (2013.01); *H04N 1/00018* (2013.01); *H04N 1/00037* (2013.01); *H04N 1/0057* (2013.01); *H04N 1/00076* (2013.01); *H04N 2201/0094* (2013.01)

(58) Field of Classification Search
None
See application file for complete search history.

(56) References Cited

U.S. PATENT DOCUMENTS 4,908,655 A * 3/1990 Takagi ................... G03G 15/55
340/675
4,996,557 A    2/1991 Takagi
(Continued)

FOREIGN PATENT DOCUMENTS

CN    102122261 A    7/2011
JP    63-258345 A    10/1988
(Continued)

OTHER PUBLICATIONS

First Office Action issued in corresponding Chinese Patent Application No. 201710150161.4, dated Nov. 2, 2018, with English Translation (16 pages).
(Continued)

*Primary Examiner* — Frantz Bataille
(74) *Attorney, Agent, or Firm* — Buchanan Ingersoll & Rooney PC

(57) ABSTRACT

An image forming apparatus includes: a display portion; an error sensor that detects an operating error; a recovery sensor that detects the recovery from an operating error; and a display processor that makes the display portion display a notice of an operating error when the error sensor detects the operating error and that makes the display portion display an operation guide for preventing the reoccurrence of the same operating error when the recovery sensor detects the recovery from the operating error.

20 Claims, 13 Drawing Sheets

(56) References Cited

U.S. PATENT DOCUMENTS

| | | | | |
|---|---|---|---|---|
| 2007/0220359 A1* | 9/2007 | Mochizuki | ............ | G03G 15/55 |
| | | | | 714/44 |
| 2012/0268771 A1* | 10/2012 | Kruizinga | .......... | H04N 1/00029 |
| | | | | 358/1.14 |
| 2014/0219667 A1* | 8/2014 | Shokai | ................ | B41M 7/0009 |
| | | | | 399/19 |
| 2015/0175369 A1* | 6/2015 | Murata | ................ | B65H 3/0669 |
| | | | | 271/227 |

FOREIGN PATENT DOCUMENTS

| | | | |
|---|---|---|---|
| JP | 2004-145194 A | 5/2004 | |
| JP | 2013-031033 A | 2/2013 | |

OTHER PUBLICATIONS

The Second Office Action dated Jul. 1, 2019, by the State Intellectual Property Office of the People's Republic of China in corresponding Chinese Patent Application No. 201710450161.4 and an English translation of the Office Action. (14 pages).

* cited by examiner

D3 171

Preparing for printing

Please return the following number of pages to the document. 25/08/2016 10:31
1
Remaining Memory 100%

Y☐ M☐ C☐

| Job No. | Paper | Scale | Both-sided/Page Layout | Color |
|---|---|---|---|---|
| 13 | 1  A4 | 70.79% | Single-sided><br>Single-sided | Auto-Color |

Please keep the document cover closed during a job.
Please press the OK button.

Number of Pages to Return

| 1 | OK |

Preparing for printing

Please return the following number of pages to the document. 25/08/2016 10:31
1
Remaining Memory 100%

Y☐ M☐ C☐

| Job No. | Paper | Scale | Both-sided/Page Layout | Color |
|---|---|---|---|---|
| 13 | 1  A4 | 70.79% | Single-sided><br>Single-sided | Auto-Color |

Please set the document in a correct position
and press the OK button.

Number of Pages to Return

| 1 | OK |

FIG. 7

| FIG. 10A |
| FIG. 10B |

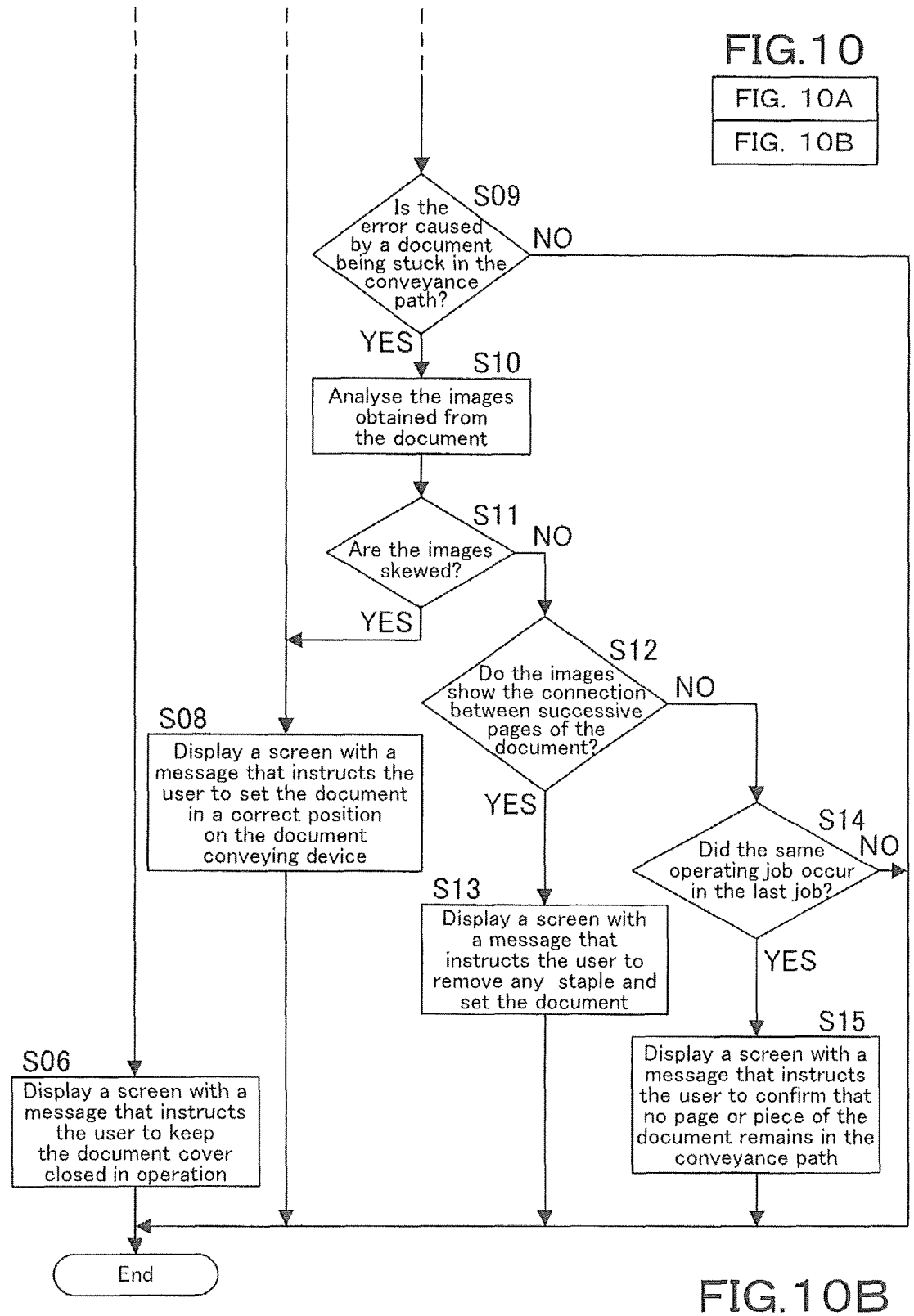

ND RECORDING MEDIUM

This application claims priority under 35 U.S.C. § 119 to Japanese Patent Application No. 2016-120903 filed on Jun. 17, 2016, the entire disclosure of which is incorporated herein by reference in its entirety.

BACKGROUND OF THE INVENTION

Field of the Invention

The present invention relates to an image forming apparatus such as a multi-function peripheral (MFP), i.e., a multifunctional digital machine, an error preventing method for the image forming apparatus, and a recording medium.

Description of the Related Art

The following description sets forth the inventor's knowledge of related art and troubles therein and should not be construed as an admission of knowledge in the prior art.

As is known, image forming apparatuses such as MFPs are configured to detect various operating errors while executing a job, for example. Such an image forming apparatus is provided with, for example: a document conveying device that feeds and conveys documents; and a paper conveying mechanism that feeds and conveys paper for image forming. According to a publicly-known technique (Japanese Unexamined Patent Application Publication No. S63-258345), the image forming apparatus is configured to detect an operating error and concurrently display a solution to the error on its operation panel when a trouble in conveyance control occurs (such as a paper jam or wrong paper size).

There may be more than one possible cause of the operating error. To address this case, according to another publicly-known technique (Japanese Unexamined Patent Application Publication No. 2004-145194), the image forming apparatus is configured to display a different operation guide depending on the possible cause. This allows the user to resolve an operating error quickly and remember how to prevent the reoccurrence of the same operating error. Specifically, one of the possible causes may be wrong paper size. If the error occurred immediately after paper was set on the paper feed tray, the image forming apparatus displays (1) a screen that shows the location of the error and instructs the user to check the paper size settings. If the error did not occur immediately after that, the forming apparatus displays (2) a screen that shows the location of the error and instructs the user to check the condition of paper on the paper feed tray. This allows the user to know a possible cause of the error.

Actually, according to the publicly-known techniques including those described in Japanese Unexamined Patent Application Publications No. S63-258345 and No. 2004-145194, the image forming apparatuses are configured to detect an operating error and concurrently display a solution to the error on its operation panel when the error occurs, and then hide the solution when the user restarts the job after resolving the error. In these techniques, there is an unsolved problem as described below.

When the user encounters an operating error, he/she often concentrates on thinking about resolving the error, thus it is not unusual that the user subconsciously restarts the job without seeing the location of the error and instructions, which is displayed on the display. And it would not be unlikely if the user encountered the same operating error next time because such a solution to the error is hidden from the display when he/she restarts the job after resolving the error.

SUMMARY OF THE INVENTION

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

A first aspect of the present invention relates to an image forming apparatus including:

a display portion;

an error sensor that detects an operating error;

a recovery sensor that detects the recovery from an operating error; and a display processor that makes the display portion display a notice of an operating error when the error sensor detects the operating error and that makes the display portion display an operation guide for preventing the reoccurrence of the same operating error when the recovery sensor detects the recovery from the operating error.

A second aspect of the present invention relates to an error preventing method for an image forming apparatus, the error preventing method including:

detecting an operating error;

detecting the recovery from an operating error; and making a display portion display a notice of an operating error when the operating error is detected and making the display portion display an operation guide for preventing the reoccurrence of the same operating error when the recovery from the operating error is detected.

A third aspect of the present invention relates to a non-transitory computer-readable recording medium storing an error preventing program to make a computer of an image forming apparatus execute:

detecting an operating error;

detecting the recovery from an operating error; and making a display portion display a notice of an operating error when the operating error is detected and making the display portion display an operation guide for preventing the reoccurrence of the same operating error when the recovery from the operating error is detected.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying drawings, in which:

FIG. 6 illustrates a screen that shows an example of an operation guide for preventing the reoccurrence of a document feed or conveyance trouble;

FIG. 7 illustrates a screen that shows another example of an operation guide for preventing the reoccurrence of a document feed or conveyance trouble;

FIGS. 10A and 10B show a flowchart representing a processing to be executed by the image forming apparatus when the image forming apparatus detects an operating error that is a document conveyance trouble on a document conveying device;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described with reference to the accompanying drawings.

Figure 1:
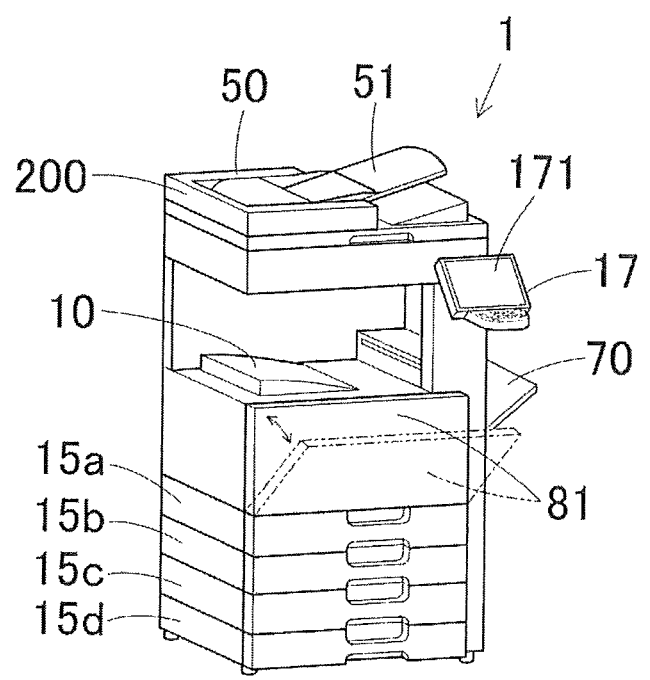
FIG. 1 is a perspective view illustrating the exterior of an image forming apparatus according to one embodiment of the present invention.

FIG. 1 is a perspective view illustrating the exterior of an image forming apparatus 1 according to one embodiment of the present invention. In this embodiment, a MFP, i.e., a multifunctional digital image forming apparatus as described above is employed as the image forming apparatus 1. Hereinafter, the image forming apparatus 1 will also be referred to as MFP 1.

The MFP 1 is provided with a document conveying device (ADF) 50 on its top; the document conveying device 50 automatically feeds a document set on a document tray 51 and conveys it to a scanning position. The MFP 1 is further provided with: an operation panel 17 in the upper-right part of its front; paper feed cassettes 15a to 15d in its lower part; and a manual-bypass tray 70 on its side.

Moreover, the MFP 1 is provided with a front door cover 81 in the middle part of its front. The front door cover 81 is hinged at its bottom such that the user can pull and push the front door cover 81 to open and close it. The user can use the front door cover 81, for example, to replace a toner cartridge; however, when the user opens the front door cover 81 while paper is being conveyed for a print job, the MFP 1 detects an operating error by its sensor and stops the job and paper conveyance. Although not shown in this figure, the MFP 1 is further provided with one or more side door covers on the side where the manual-bypass tray 70 is positioned: the user can use the one or more side door covers to remove jammed paper. When the user opens any of these side door covers while paper is being conveyed for a print job, the MFP 1 stops executing the job and paper conveyance as is the case with the front door cover 81.

Although not shown in this figure, the MFP 1 may be provided with a finisher that executes finishing options after printing paper. When the user opens a door cover for this finisher while paper is being conveyed for a print job, the MFP 1 detects an operating error by its sensor and stops the currently active job and paper conveyance as is the case with the front door cover 81 and the other door covers.

Figure 2:
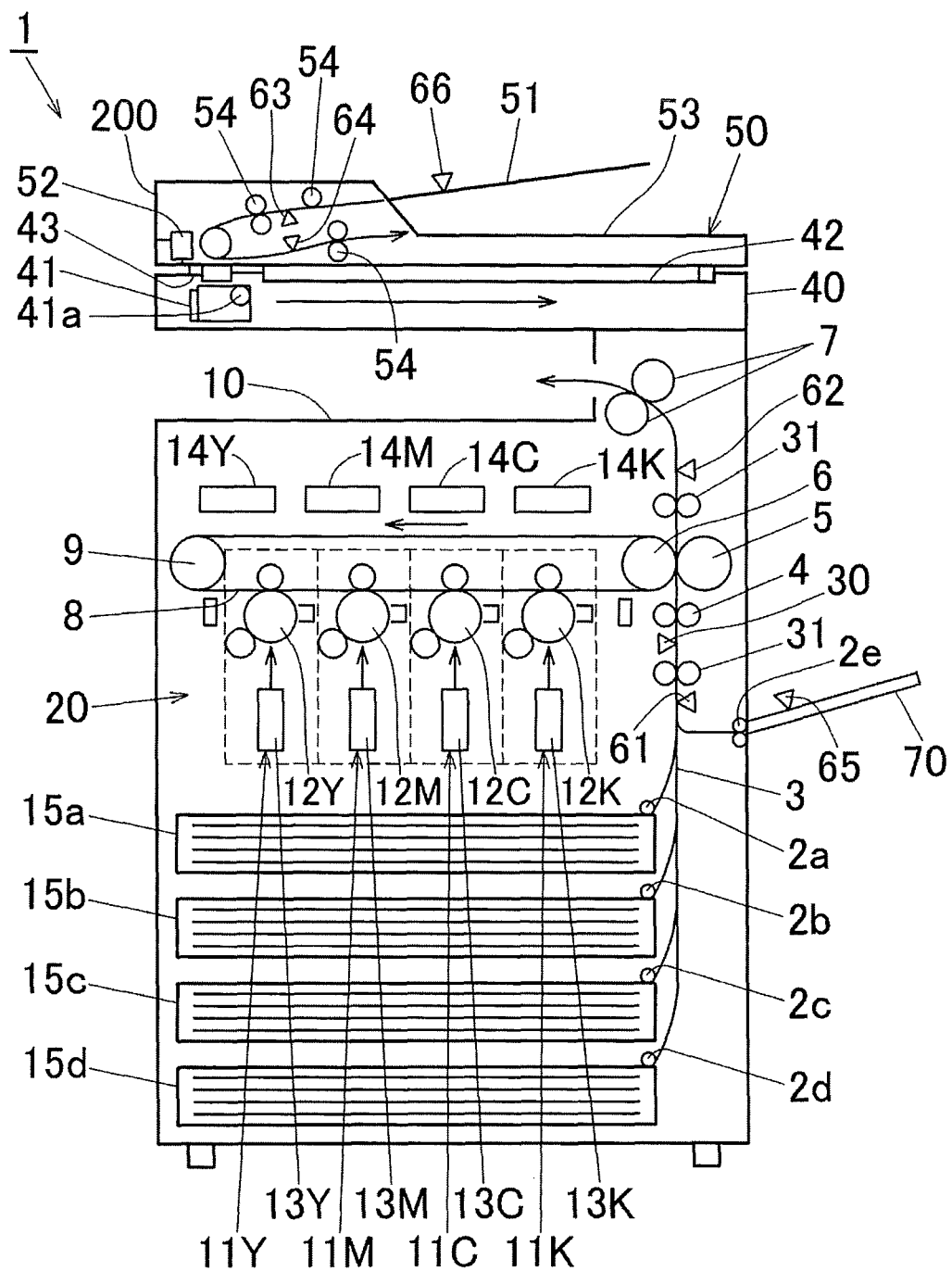
FIG. 2 illustrates a comprehensive configuration of the interior of the image forming apparatus.

FIG. 2 illustrates a comprehensive configuration of the interior of the MFP 1. The MFP 1 is provided with a printer (engine) 20, a scanner 40, and the aforementioned document conveying device 50, the configurations of which are already well known. So, the printer 20, the scanner 40, and the document conveying device 50 will be only briefly described below along with their operations.

When the printer 20 receives instructions for starting printing from an image controller (not shown in this figure), paper feed rollers 2a to 2e feed paper from the paper feed cassettes 15a to 15d or from the manual-bypass tray 70, and multiple pairs of conveyance rollers 31, which are disposed at predetermined positions, convey the paper along a conveyance path 3. The pairs of conveyance rollers 31 put the paper on hold at a position of the conveyance path 3 where a timing sensor 30 detects the paper. One or more sensors 65 that judge whether or not paper is set in a correct position are disposed on the manual-bypass tray 70. Moreover, multiple other sensors that detect the passing of paper and a paper jam, such as sensors 61 and 62, are disposed at predetermined positions along the conveyance path 3. Although not shown in this figure, the MFP 1 is provided with other sensors that detect the opening and closing of the door cover 80 on its front and the same of the side door covers on its side.

With the rotation of a transfer belt driving roller 9, a transfer belt 8 circulates about the transfer belt driving roller 9 and a driven roller 6.

Along the outer and lower surface of the transfer belt 8, four image forming process units (imaging units) 11Y, 11M, 11C, and 11K are disposed in parallel for yellow (Y), magenta (M), Cyan (C), and black (K) colors, respectively. While the transfer belt 8 circulates, the image forming process units 11Y, 11M, 11C, and 11K form YMCK toner images on the transfer belt 8. As is shown, also provided are exposure devices 13Y, 13M, 13C, and 13K that expose photosensitive drums 12Y, 12M, 12C, and 12K to light, respectively.

Disposed adjacent to the process units 11Y, 11M, 11C, and 11K, respectively, are toner cartridges 14Y, 14M, 14C, and 14K containing YMCK toners.

Being circulated, the transfer belt 8 conveys the toner images layered on the transfer belt 8 itself. Upon the reach of the toner images to a second transfer roller 5, the timing roller 4 is started to convey paper such that the upper end of the paper is adjusted to the same of the toner images on the transfer belt 8.

While the paper is passing through the driven roller 6 and the second transfer roller 5, voltage is applied to the second transfer roller 5, and thereby the toner images on the transfer belt 8 are transferred onto the paper. After being transferred onto the paper, the toner images are further fused on the paper by a fuser roller 7. The paper with the fused toner images is output onto a paper output tray 10.

The scanner 40 includes a scan unit 41 which is provided with a CCD (not shown in this figure) and an exposure lamp 41a both for reading a document image. The scanner 40 reads a document image by scanning a document that is put on a platen glass 42 serving as a document table.

Disposed on the scanner 40 is the document conveying device 50 that automatically feeds and conveys a document as described above. The document conveying device 50 feeds one or more pages of a document loaded on a document tray 51 one after another and conveys them to a scanning position 43 of the scanner 40 via a conveyance roller 54; in other words, the document conveying device 50 scans a document while conveying it, and then outputs it onto a document output tray 53.

The document conveying device 50 is hinged at its farthest end from the user such that the user can open and close the document conveying device 50 by lifting it up and down. The user can lift up the document conveying device 50 to uncover the platen glass 42 and put a document on the platen glass 42; the user can lift down the document conveying device 50 to cover the platen glass 42. That is, the document conveying device 50 also functions as a document cover 200 that can cover and uncover the platen glass 42 that serves as a document table. The opening and closing of the document cover 200 is detected by a sensor not shown in this figure.

One or more sensors 66 that judge whether or not a document is set in a correct position are disposed on the document tray 51. Moreover, one or more other sensors that detect the passing of a document and a paper jam, such as sensors 63 and 64, are disposed along a document conveyance path.

The scanner 40 transfers image data, which is obtained by scanning a document, to the image controller not shown in this figure, and the image controller performs image processing on the image data. Assuming that the user gave instructions for copying via the operation panel 17, the scanner 40 will transfer the image data, which has been subjected to image processing, to the printer 20. Assuming that the user gave instructions for scanning, the scanner 40 will convert the image data into an image format and output the image formatted data.

Figure 3:
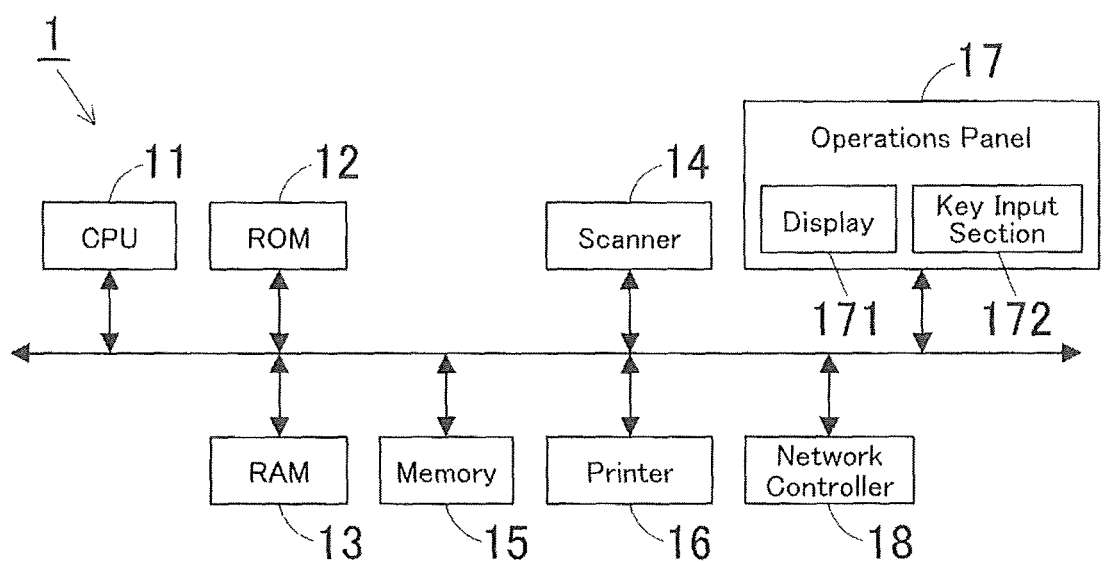
FIG. 3 is a block diagram illustrating an electrical configuration of the image forming apparatus.

FIG. 3 is a block diagram illustrating an electrical configuration of the MFP 1.

The MFP 1 is essentially provided with: a CPU 11; a ROM 12; a RAM 13; a scanner 14; a memory 15; a printer 16; an operation panel 17; and a network controller (also referred to as NIC) 18.

The CPU 11 controls the MFP 1 in a unified and systematic manner such that the user can use the basic functions of the MFP 1 such as a copier function, a printer function, a scanner function, and a facsimile function. Furthermore, the CPU 11 detects an operating error such as a paper jam and the recovery from the operating error, by the sensors 61 to 66. Upon detecting an operating error, the CPU 11 stops the current job and displays a notice of the occurrence of the operating error and an operation guide for resolving the operating error, on a display 171 of the operation panel 17. Upon detecting the recovery from the operating error, the CPU 11 displays an operation guide for preventing the reoccurrence of the same operating error on the display 171. These operations will be later described in detail.

The ROM 12 is a memory that essentially stores operation programs for the CPU 11.

The RAM 13 is a memory that provides a work area for the CPU 11 to perform processing in accordance with an operation program.

The scanner 40 is a reading means that reads a document image by scanning a document that is put on the document conveying device 50 or the platen glass 42 and that outputs an image formatted file. The scanner 14 is identical with the scanner 40 shown in FIG. 2.

The memory 15 is comprised of a non-volatile memory device such as a hard disk drive (HDD). The memory 15 essentially stores different information objects, which are to appear on the display 171 depending on the operating error, a job history, document images obtained by the scanner 14, and print data received from user terminals.

The printer 16 prints image data obtained from a document by the scanner 14 and print data received from user terminals in a specified print mode.

The operation panel 17 serves for various input operations and is provided with a display 171 and a key input section 172. The display 171 is comprised of, for example, a touch panel liquid-crystal display that displays messages and operation screens; the key input section 172 is provided with a numeric keypad, a start key, a stop key, and other keys.

The network controller 18 maintains data transmission and receipt by controlling communication with other image forming apparatuses and external apparatuses such as user terminals on the network.

Hereinafter, the operation to be performed by the MFP 1 when the MFP 1 detects an operating error will be described.

In this embodiment, upon detecting an operating error, the MFP 1 stops the current job and displays a notice of the occurrence of the operating error and an operation guide for resolving the operating error, on the display 171 of the operation panel 17. In the case where the operating error is caused by a human mistake, upon the recovery from the operating error, the MFP 1 displays an operation guide for preventing the reoccurrence of the same operating error on the display 171.

Document feed or conveyance troubles on the document conveying device 50 and paper feed or conveyance troubles are typical operating errors that can be caused by human mistakes. Hereinafter, specific examples of these troubles will be described.

[1] Document Feed or Conveyance Troubles

Figure 4:
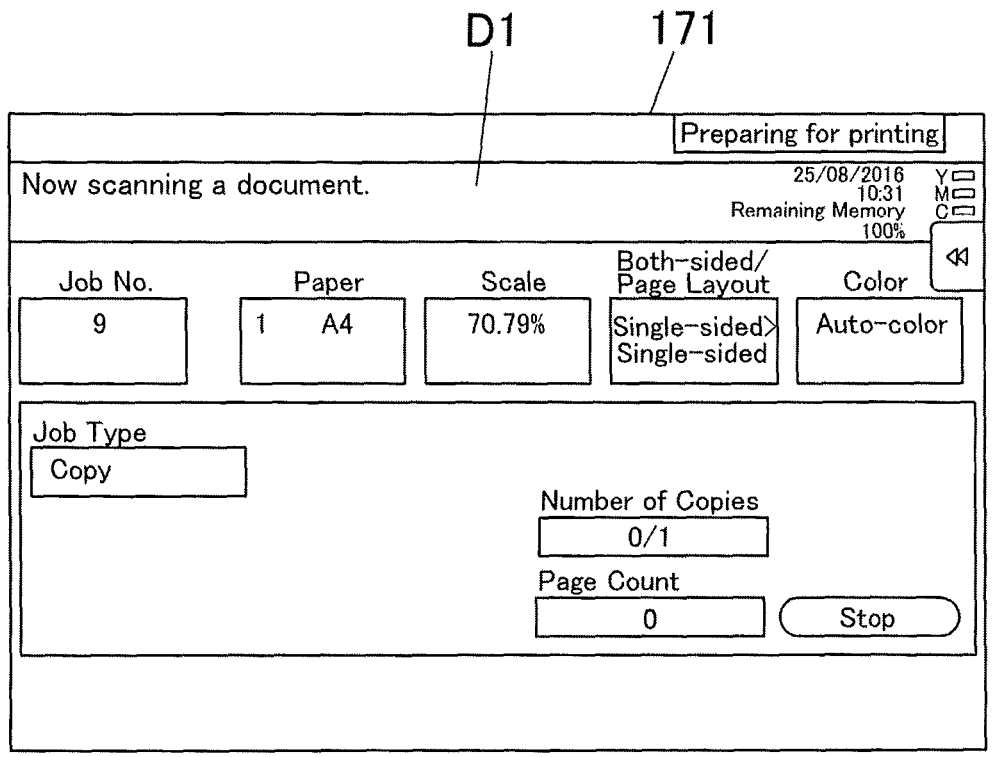
FIG. 4 illustrates a screen to be displayed on the display while a document is being read.

For example, while a document is being conveyed by the document conveying device 50 for a copy job, i.e., while a document is being read, the MFP 1 displays a screen D1 with a message stating that the document is currently being read, on the display 171, as illustrated in FIG. 4.

Figure 5:
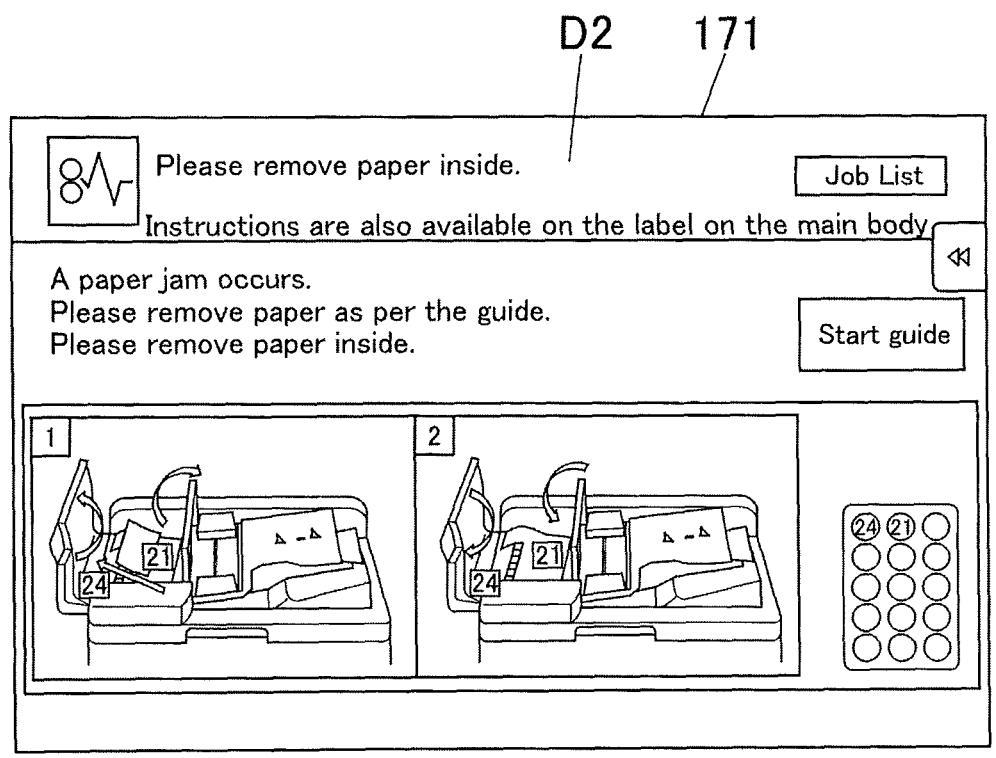
FIG. 5 illustrates a screen to be displayed on the display when a paper jam occurs.

If a document feed or conveyance trouble occurs while a document is being read, the CPU 11 detects an operating error by the sensors 63, 64, and 66 and stops document feed and conveyance, resulting in a paper jam. Meanwhile, the MFP 1 displays a screen D2 as illustrated in FIG. 5 on the display 171; the screen D2 shows messages that notify of the occurrence of a paper jam and instruct the user to remove jammed paper as per a video guide, along with illustrations showing the location of the paper jam. The user can replay a video guide on how to remove jammed paper by pressing a start guide button. These messages and the guide on how to remove jammed paper may be speech information instead of text or visual information.

For example, if the user opens the document cover 200 while a document is being fed or conveyed, i.e., if the user opens the document cover 200 improperly, a paper jam will occur. For another example, if the user fails in setting a multi-page document in a correct position, document feed will be stopped halfway through, resulting in a paper jam. If the user sets a multi-page document with a paper holder such as a staple or clip and if the user sets a multi-page document with a tilt, document conveyance will be stopped halfway through, resulting in a paper jam. For yet another example, if a page or piece of a document remains in the conveyance path since the last job, a paper jam will occur.

In this embodiment, upon the recovery from an operating error that is a document feed or conveyance trouble, the MFP 1 displays an operation guide for preventing the reoccurrence of the same trouble, which is different depending on the cause of the trouble, on the display 171.

The trouble may be caused by the document cover 200 being opened while a document is being fed or conveyed. In this case, the MFP 1 displays a screen D3 as illustrated in FIG. 6; the screen D3 shows messages that instruct the user to return one page to the document, keep the document cover 200 closed in operation, and then press the OK button. When the user returns one page to the document and presses the OK button as instructed by the messages, the MFP 1 then restarts document scan, feed, and conveyance. Furthermore, upon the recovery from the operating error, the MFP 1 displays a message that instructs the user to keep the document cover 200 closed in operation. This serves the user to remember to keep the document cover 200 closed in operation, thus contributing significantly to the prevention of the reoccurrence of the same operating error.

The trouble may be caused by a document being set in a wrong position. In this case, the MFP 1 displays a screen D4 as illustrated in FIG. 7; the screen D4 shows messages that instruct the user to return one page to the document, set the document in a correct position, and then press the OK button. When the user returns one page to the document and presses the OK button as instructed by the messages, the MFP 1 then restarts document scan, feed, and conveyance. Furthermore, upon the recovery from an operating error that is caused by a document being set in a wrong position, the MFP 1 displays a message that instructs the user to set the document in a correct position on the document conveying device 50. This allows the user to remember to set a document in a correct position, thus contributing significantly to the prevention of the reoccurrence of the same operating error.

Figure 8:
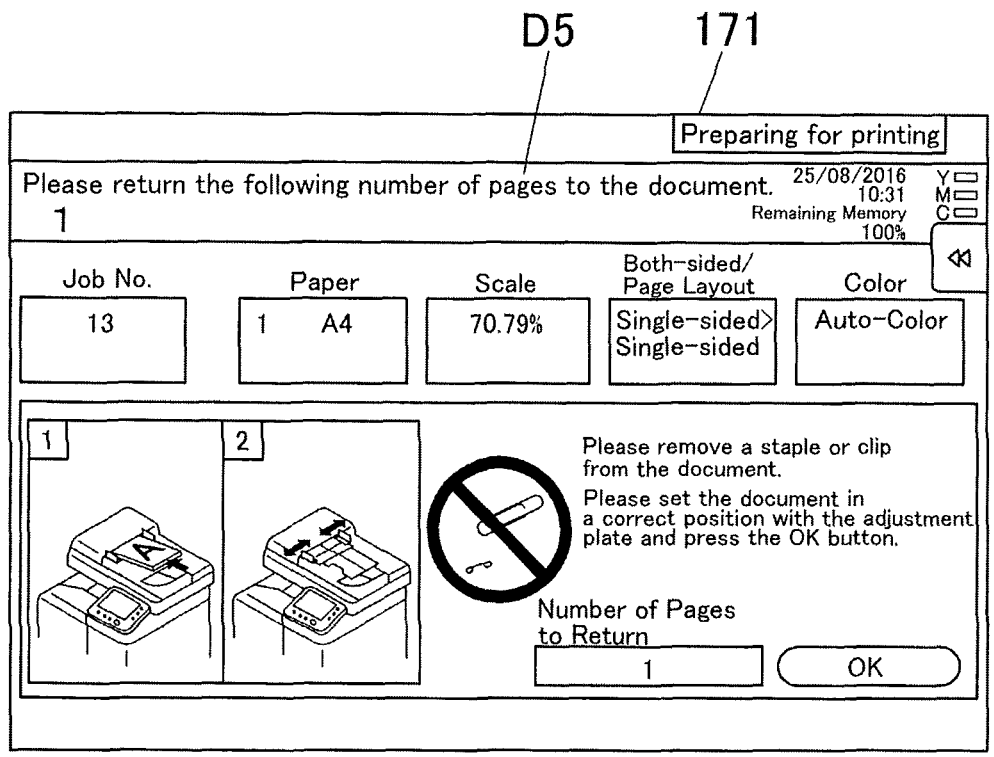
FIG. 8 illustrates a screen that shows yet another example of an operation guide for preventing reoccurrence of a document feed or conveyance trouble.

The trouble may be caused by a multi-page document with a staple or clip. In this case, the MFP 1 displays a screen D5 as illustrated in FIG. 8; the screen D5 shows messages that instruct the user to return one page to the document, remove any staple or clip from the document, set the document in a correct position with the adjustment plate, and then press the OK button. In addition, the MFP 1 also displays illustrations on how to set the document in a correct position with the adjustment plate. The trouble may be caused by a document set at a tilt. In this case, the MFP 1 displays the screen D5 as illustrated in FIG. 8; however, the screen D5 shows a message that instructs the user to set the document upright, instead of a message that instructs the user to remove any staple or clip from the document. When the user returns one page to the document and presses the OK button as instructed by the messages, the MFP 1 then restarts document scan, feed, and conveyance. Furthermore, upon the recovery from an operating error that is caused by a multi-page document with a staple or clip or by a document set at a tilt, the MFP 1 displays a message that instructs the user to remove any staple or clip and set the document or a message that instructs the user to set the document in a correct position on the document conveying device 50. This serves the user to remember to set a document unstapled or unclipped or to set a document in a correct position, thus contributing significantly to the prevention of the reoccurrence of the same operating error.

The MFP 1 is configured to conduct analysis on images having been obtained by the scanner 14 before stopping document conveyance. By conducting the analysis, the MFP 1 judges whether or not the operating error is caused by a multi-page document with a staple or clip or by a multi-page document set at a tilt. Specifically, when the scanner 14 scans a multi-page document with a staple or clip, document images obtained by the scanner 14 will quite likely show the connection between successive pages of the document. So, if the document images show the connection between successive pages of the document, the MFP 1 judges that the operating error is caused by a multi-page document with a staple or clip.

When the scanner 14 scans a document set at a tilt, document images obtained by the scanner 14 will quite likely be tilted (or skewed) as well. So, if the document images are skewed, the MFP 1 judges that the operating error is caused by a document being set at a tilt.

The MFP 1 is configured to conduct analysis on document images and judges the cause of the operating error as described above, in the time after stopping document conveyance and before detecting the recovery from the error.

Figure 9:
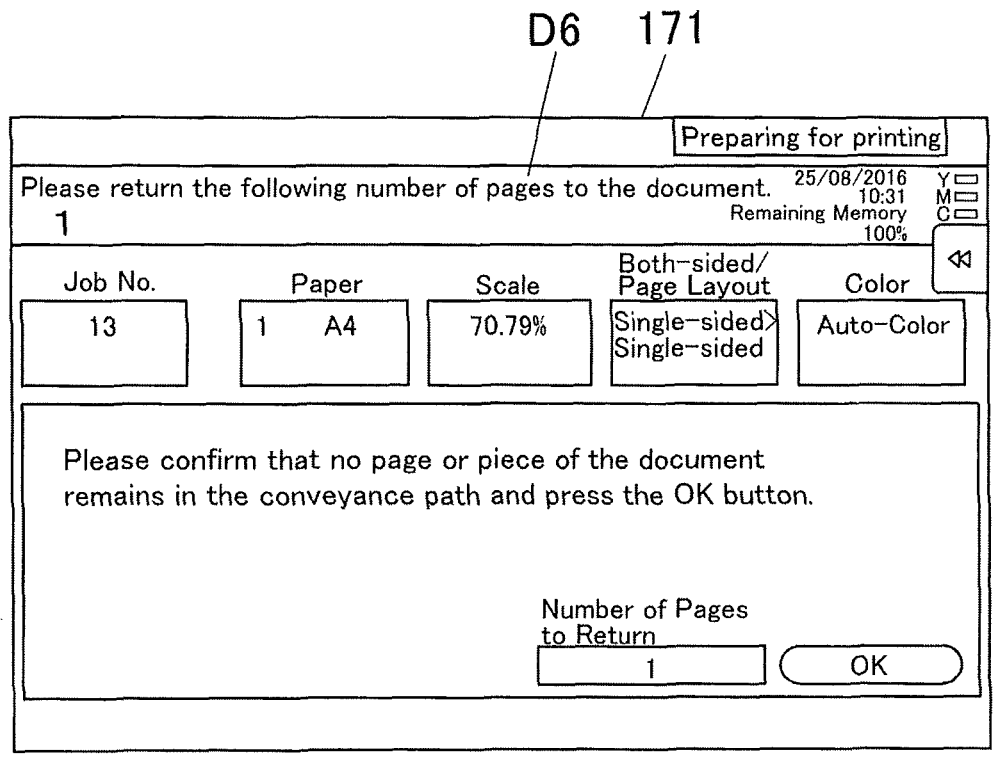
FIG. 9 illustrates a screen that shows still yet another example of an operation guide for preventing the reoccurrence of a document feed or conveyance trouble.

The trouble may be caused by a page or piece of a document remaining in the conveyance path since the last job. In this case, the MFP 1 displays a screen D6 as illustrated in FIG. 9; the screen D6 shows a message that instructs the user to confirm that no page or piece of the document remains in the conveyance path. The MFP 1 can erroneously detect the recovery from the error in the case where the page or piece of the document in the conveyance path is out of the range of any sensor. When the user confirms that no page or piece of the document remains in the conveyance path and presses the OK button as instructed, the MFP 1 then restarts document conveyance. Furthermore, upon the recovery from an operating error that is caused by a page or piece of a document in the document conveyance path, the MFP 1 displays a message that instructs the user to confirm that no page or piece of the document remains in the path. This serves the user to remember to confirm that no page or piece of a document remains in the path, thus contributing significantly to the prevention of the reoccurrence of the same operating error.

As described above, upon the recovery from each operating error that is caused by a human mistake, the MFP 1 displays an operation guide for preventing the reoccurrence of the same operating error for the user. This serves the user to learn the cause of the operating error, thus contributing significantly to the prevention of the reoccurrence of the same operating error.

Figures 10, 10A:
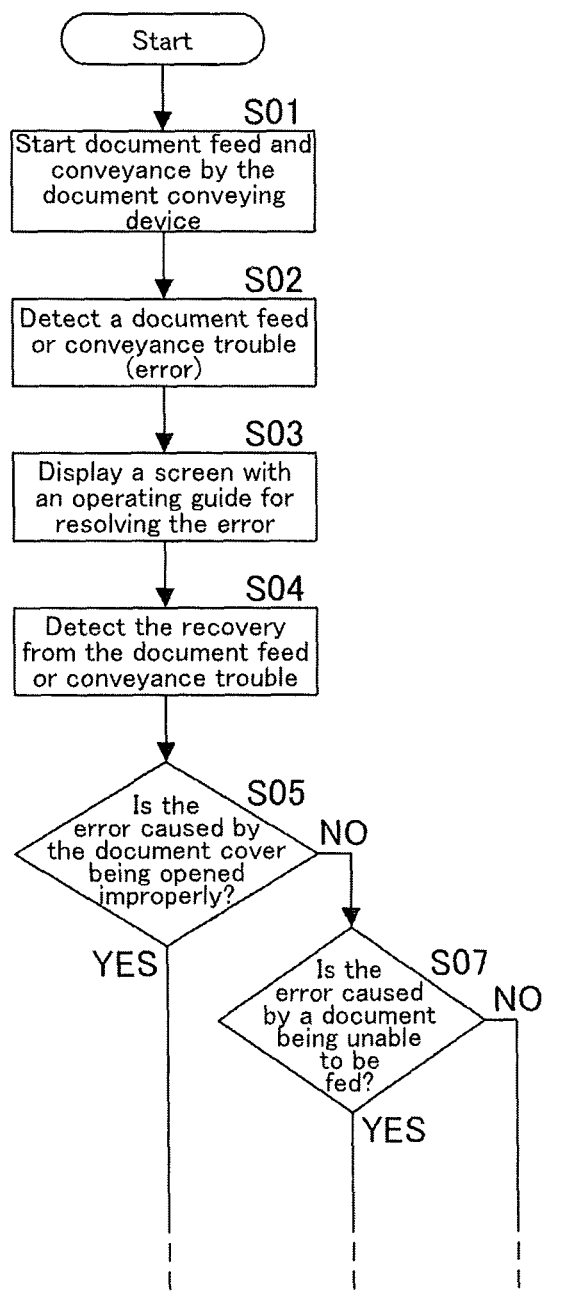

FIGS. 10A and 10B show a flowchart representing a processing to be executed by the MFP 1 when the MFP 1 detects an operating error that is a document conveyance trouble on the document conveying device. The flowchart shown in FIGS. 10A and 10B and the following flowcharts are executed by the CPU 11 of the MFP 1 in accordance with operation programs stored on a recording medium such as the ROM 12.

In Step S01, the CPU 11 starts document feed and conveyance by the document conveying device 50; in Step S02, the CPU 11 detects a document feed or conveyance trouble (an operating error). In Step S03, the CPU 11 displays a screen with a notice of the occurrence of the operating error and an operation guide for resolving the operating error, on the display 171 of the operation panel 17.

As soon as the user resolves the operating error, the CPU 11 detects the recovery from the document feed or conveyance trouble (the operating error) in Step S04. In Step S05, the CPU 11 then judges whether or not the operating error is caused by the document cover 200 being opened improperly, i.e., whether or not the operating error is caused by the document cover 200 being opened while a document is being read. If it is caused by the document cover 200 being opened improperly (YES in Step S05), the CPU 11 displays a screen with a message that instructs the user to keep the document cover 200 closed in operation, in Step S06.

If it is not caused by the document cover 200 being opened improperly (NO in Step S05), the CPU 11 then judges whether or not the operating error is caused by a failure in feeding a document, in Step S07. If it is caused by a failure in feeding a document (YES in Step S07), the CPU 11 displays a screen with a message that instructs the user to set the document in a correct position, in Step S08.

If it is not caused by a failure in feeding a document (NO in Step S07), the CPU 11 then judges whether or not the operating error is caused by a document being stuck in the conveyance path, in Step S09. If it is not caused by a document being stuck in the conveyance path (NO in Step S09), the flowchart terminates.

If it is caused by a document being stuck in the conveyance path (YES in Step S09), the CPU 11 conducts analysis on the images obtained by document scan in Step S10 and judges whether or not the images are skewed in Step S11. If the images are skewed (YES in Step S11), the CPU 11 displays a screen with a message that instructs the user to set the document in a correct position, in Step S08. If the images are not skewed (NO in Step S11), the routine proceeds to Step S12.

In Step S12, the CPU 11 judges whether or not the images show the connection between successive pages of the document. If the images show the connection between successive pages of the document (YES in Step S12), the CPU 11 displays a screen with a message that instructs the user to remove any staple (or clip) and set the document, in Step S13. If the images do not show the connection between successive pages of the document (NO in Step S12), the CPU 11 further judges whether or not the same operating error occurred in the last job, in Step S14. If the same operating error did not occur (NO in Step S14), the routine terminates. If the same operating error occurred (YES in Step S14), the CPU 11 displays a screen with a message that instructs the user to confirm that no page or piece of the document remains in the conveyance path, in Step S15.

[1] Paper Feed or Conveyance Troubles

Figure 11:
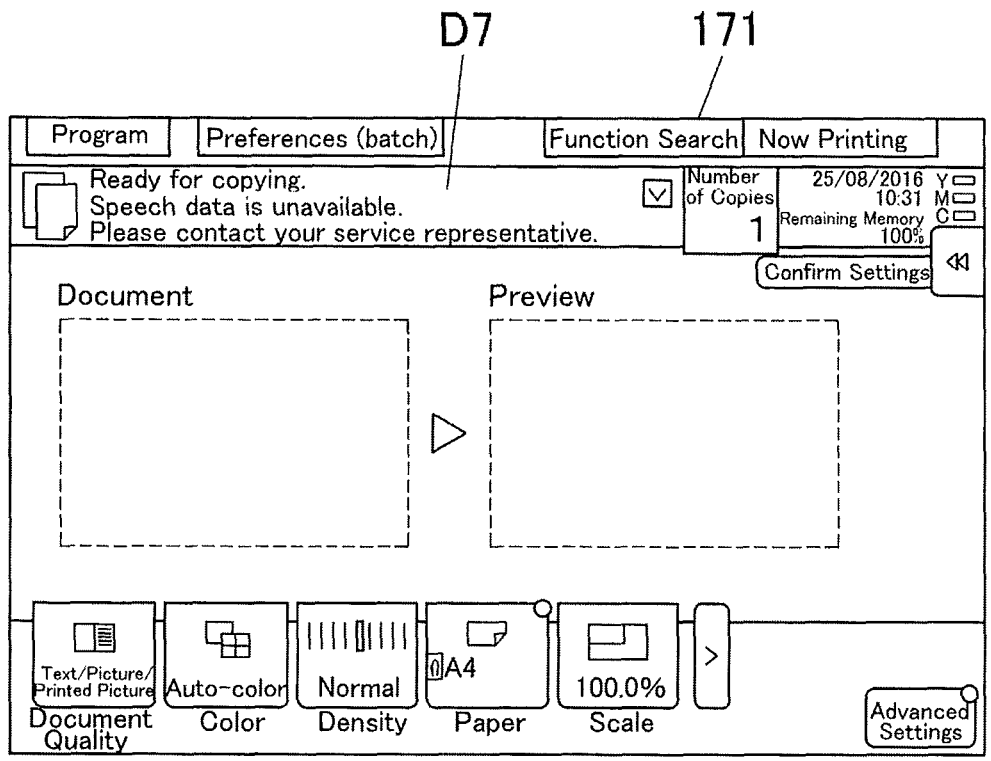
FIG. 11 illustrates a screen to be displayed on the display while paper is being printed (while paper is being conveyed)

FIG. 11 illustrates a screen D7 to be displayed on the display 171 while a copy or print job is active (while paper is being conveyed), for example.

Figure 12:
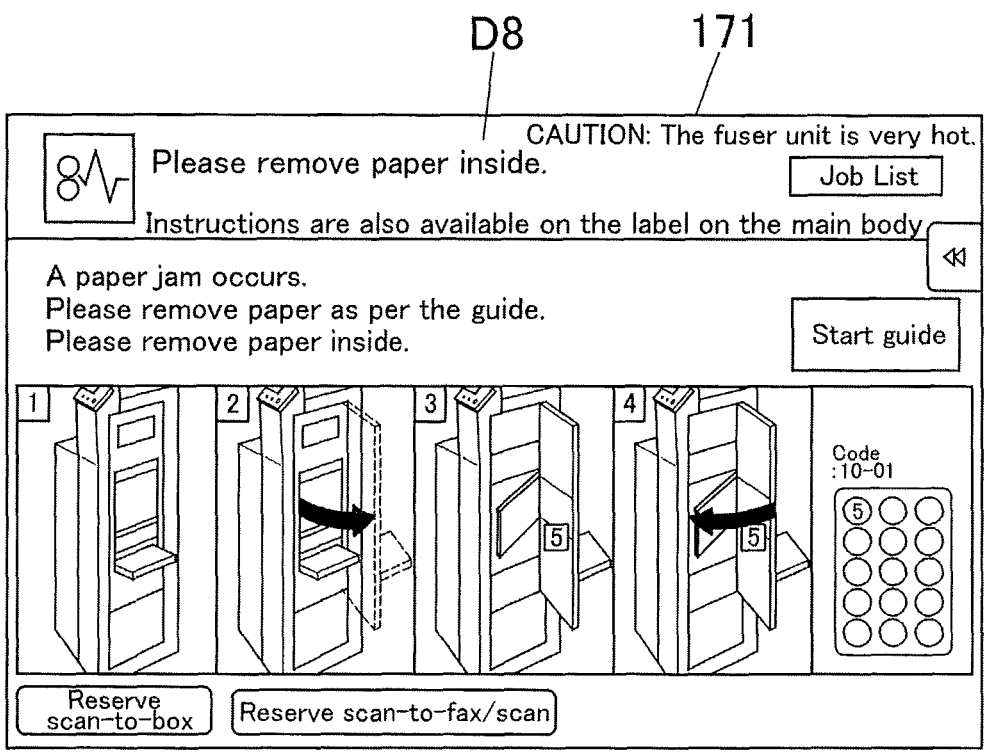
FIG. 12 illustrates a screen to be displayed on the display when a paper jam occurs.

If a paper feed or conveyance trouble occurs while paper is being fed or conveyed, the MFP 1 detects an operating error by the sensors 61, 62, and 65 and stops paper feed and conveyance, resulting in a paper jam. Meanwhile, the MFP 1 displays a screen D8 as illustrated in FIG. 12 on the display 171; the screen D8 shows messages that notify of the occurrence of a paper jam and instruct the user to remove jammed paper as per a video guide, along with illustrations showing the location of the paper jam. The user can replay a video guide on how to remove jammed paper by pressing a start guide button. These messages and the guide on how to remove jammed paper may be speech information instead of text or visual information.

For example, if the user opens the front door cover 81 or the side door cover of the MFP 1 while paper is being fed or conveyed, i.e., if the user opens any door cover improperly, a paper jam will occur. For another example, if the user fails in setting multi-sheet paper in a correct position on the manual-bypass tray 70, paper feed will be stopped halfway through, resulting in a paper jam. For yet another example, if a sheet or piece of paper remains in the conveyance path since the last job, a paper jam will occur.

In this embodiment, upon the recovery from an operating error that is a paper feed or conveyance trouble, the MFP 1 displays an operation guide for preventing the reoccurrence of the same trouble, which is different depending on the cause of the trouble, on the display 171.

Figure 13:
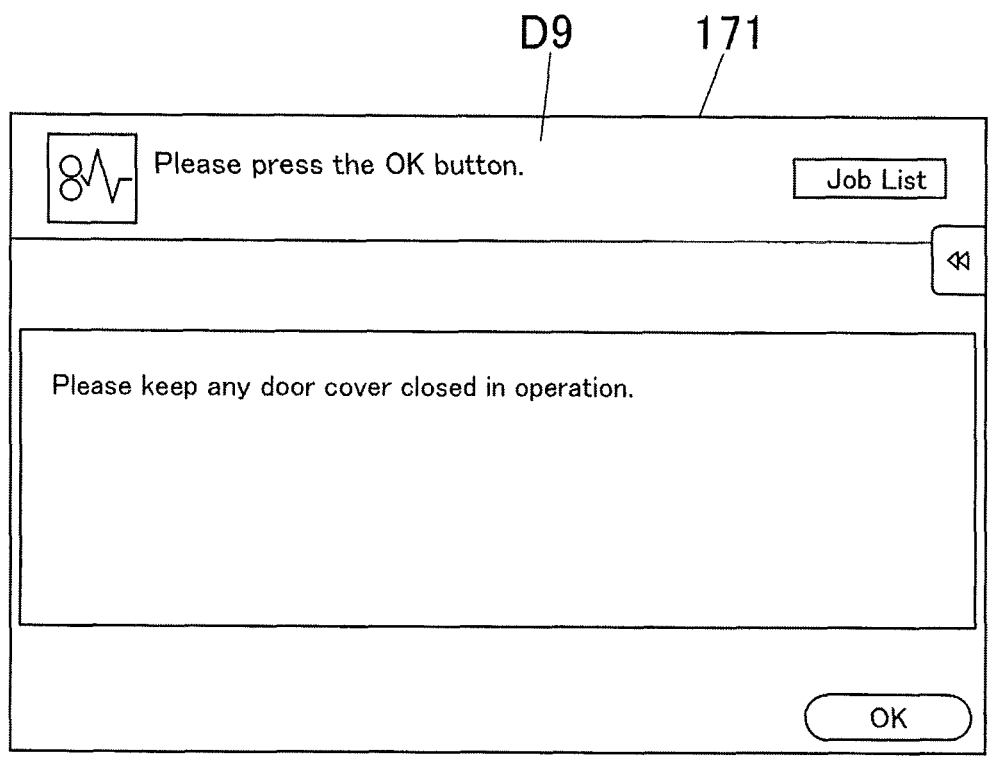
FIG. 13 illustrates a screen that shows an example of an operation guide for preventing the reoccurrence of a paper feed or conveyance trouble.

The trouble may be caused by a door cover (the front door cover 81, for example) being opened while paper is being fed or conveyed. In this case, the MFP 1 displays a screen D9 as illustrated in FIG. 13; the screen D9 shows a message that instructs the user to keep any door cover closed in operation. When the user presses the OK button, the MFP 1 restarts paper conveyance. Furthermore, upon the recovery from an operating error that is caused by a door cover being opened improperly, the MFP 1 displays a message that instructs the user to keep any door cover closed in operation. This serves the user to remember to keep any door cover closed in operation, thus contributing significantly to the prevention of the reoccurrence of the same operating error.

Figure 14:
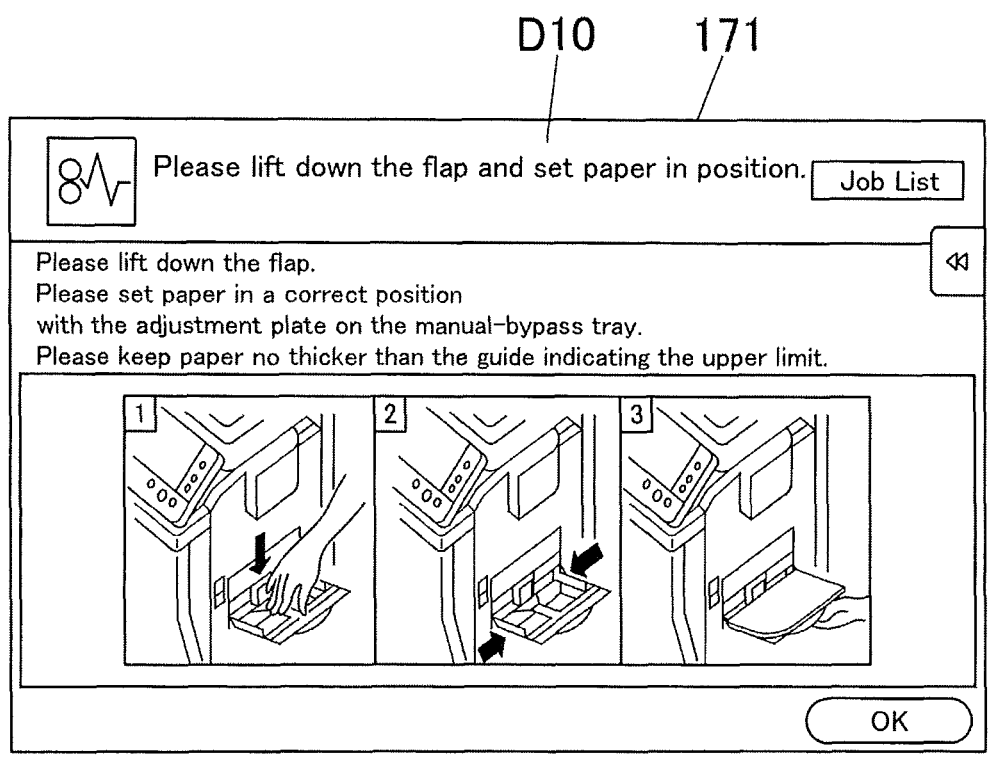
FIG. 14 illustrates a screen that shows another example of an operation guide for preventing the reoccurrence of a document feed or conveyance trouble.

The trouble may be caused by paper feed being stopped halfway through because multi-sheet paper is set in a wrong position on the manual-bypass tray 70. In this case, the MFP 1 displays a screen D10 as illustrated in FIG. 14; the screen D10 shows messages that instruct the user to lift down the flap and set paper in a correct position with the adjustment plate. When the user sets paper in a correct position and presses the OK button, the MFP 1 restarts paper conveyance. Furthermore, upon the recovery from an operating error that is caused by paper being set in a wrong position, the MFP 1 displays a message that instructs the user to set paper in a correct position. This allows the user to remember to set paper in a correct position, thus contributing significantly to the prevention of the reoccurrence of the same operating error.

Figure 15:
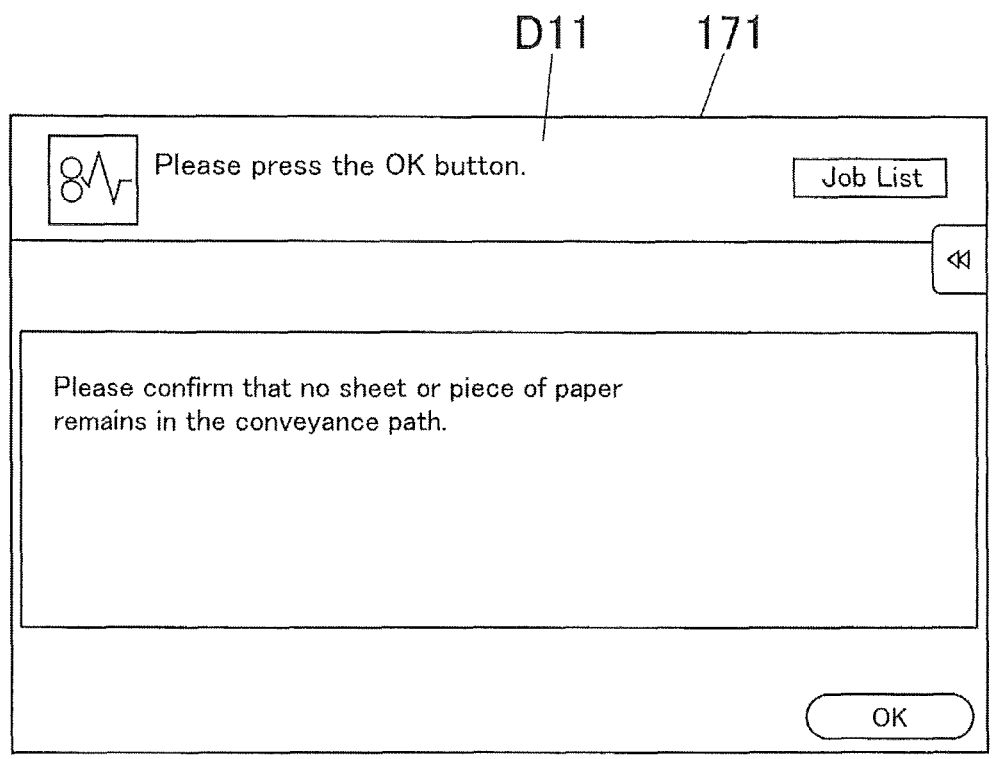
FIG. 15 illustrates a screen that shows yet another example of an operation guide for preventing the reoccurrence of a paper feed or conveyance trouble.

The trouble may be caused by a sheet or piece of paper remaining in the conveyance path since the last job. In this case, the MFP 1 displays a screen D11 as illustrated in FIG. 15; the screen D11 shows a message that instructs the user to confirm that no sheet or piece of paper remains in the conveyance path. The MFP 1 can erroneously detect the recovery from the error in the case where the sheet or piece of paper in the conveyance path is out of the range of any sensor. When the user confirms that no sheet or piece of paper remains in the conveyance path and presses the OK button as instructed, the MFP 1 then restarts paper conveyance. Furthermore, upon the recovery from an operating error that is caused by a sheet or piece of a document in the paper conveyance path, the MFP 1 displays a message that instructs the user to confirm that no sheet or piece of paper remains in the path. This serves the user to remember to confirm that no sheet or piece of paper remains in the path, thus contributing significantly to the prevention of the reoccurrence of the same operating error.

As described above, upon the recovery from each operating error that is caused by a human mistake, the MFP 1 displays an operation guide for preventing the reoccurrence of the same operating error for the user. This serves the user to learn the cause of the operating error, thus contributing significantly to the prevention of the reoccurrence of the same operating error.

Figure 16:
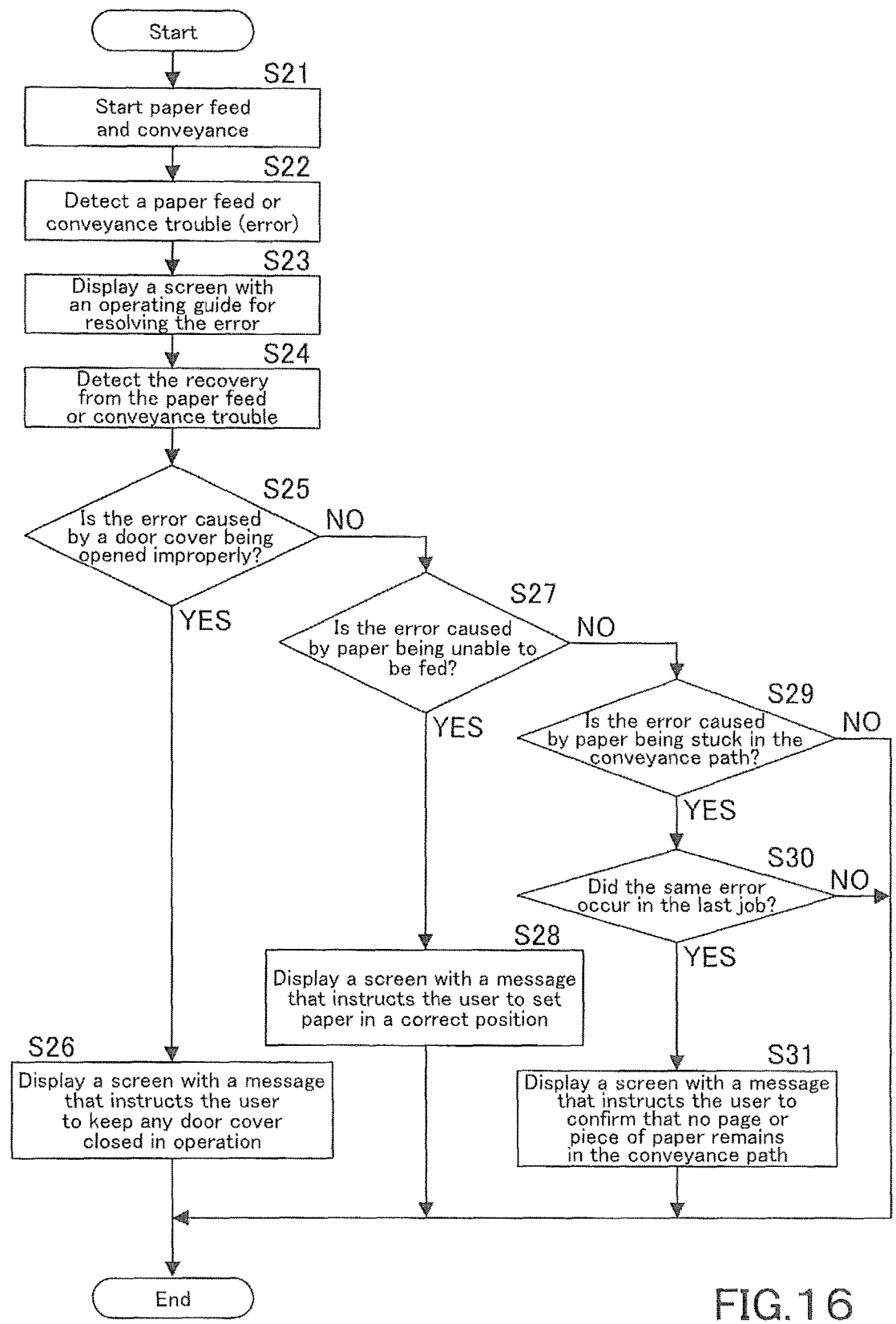
FIG. 16 is a flowchart representing a processing to be executed by the image forming apparatus when the image forming apparatus detects an operating error that is a paper feed or conveyance trouble.

FIG. 16 is a flowchart representing a processing to be executed by the MFP 1 when the MFP 1 detects an operating error that is a paper feed or conveyance trouble. The FIG. 16 flowchart is executed by the CPU 11 of the MFP 1 in accordance with operation programs stored on a recording medium such as the ROM 12.

In Step S21, the CPU 11 starts paper feed and conveyance; in Step S22, the CPU 11 detects a paper feed or conveyance trouble (an operating error). In Step S23, the CPU 11 displays a screen with a notice of the occurrence of the operating error and an operation guide for resolving the operating error, on the display 171 of the operation panel 17.

As soon as the user resolves the operating error, the CPU 11 detects the recovery from the paper feed or conveyance trouble (the operating error) in Step S24. In Step S25, the CPU 11 then judges whether or not the operating error is caused by a door cover (the front door cover 81, for example) being opened improperly, i.e., whether or not the operating error is caused by the front door cover 81 being opened while paper is being conveyed. If it is caused by a door cover being opened improperly (YES in Step S25), the CPU 11 displays a screen with a message that instructs the user to keep any door cover closed in operation, in Step S26.

If it is not caused by a door cover being opened improperly (NO in Step S25), the CPU 11 then judges whether or not the operating error is caused by a failure in feeding paper from the manual-bypass tray 70, in Step S27. If it is caused by a failure in feeding paper from the manual-bypass tray 70 (YES in Step S27), the CPU 11 displays a screen with a message that instructs the user to set paper in a correct position on the manual-bypass tray 70, in Step S28.

If it is not caused by a failure in feeding paper from the manual-bypass tray 70 (NO in Step S27), the CPU 11 then judges whether or not the operating error is caused by paper being stuck in the conveyance path, in Step S29. If it is not caused by paper being stuck in the conveyance path (NO in Step S29), the flowchart terminates.

If it is caused by paper being stuck in the conveyance path (YES in Step S29), the CPU 11 further judges whether or not the same operating error occurred in the last job, in Step S30. If the same operating error did not occur (NO in Step S30), the routine terminates. If the same operating error occurred (YES in Step S30), the CPU 11 displays a screen with a message that instructs the user to confirm that no sheet or piece of paper remains in the conveyance path, in Step S31.

While one embodiment of the present invention has been described in details herein it should be understood that the present invention is not limited to the foregoing embodiment.

For example, in this embodiment, operating errors are document feed or conveyance troubles or paper feed or conveyance troubles. Alternatively, operating errors may be other troubles than those, which are caused by human mistakes.

In this embodiment, one single operating error occurs at a time. Alternatively, two or more operating errors may occur at a time. In this case, upon the recovery from all the operating errors, the MFP 1 displays all operation guides for preventing the reoccurrence of the operating errors together in one single screen or displays all the operation guides while shuffling one from another. These operation guides are different depending on the cause of the operating error.

Figure 17:
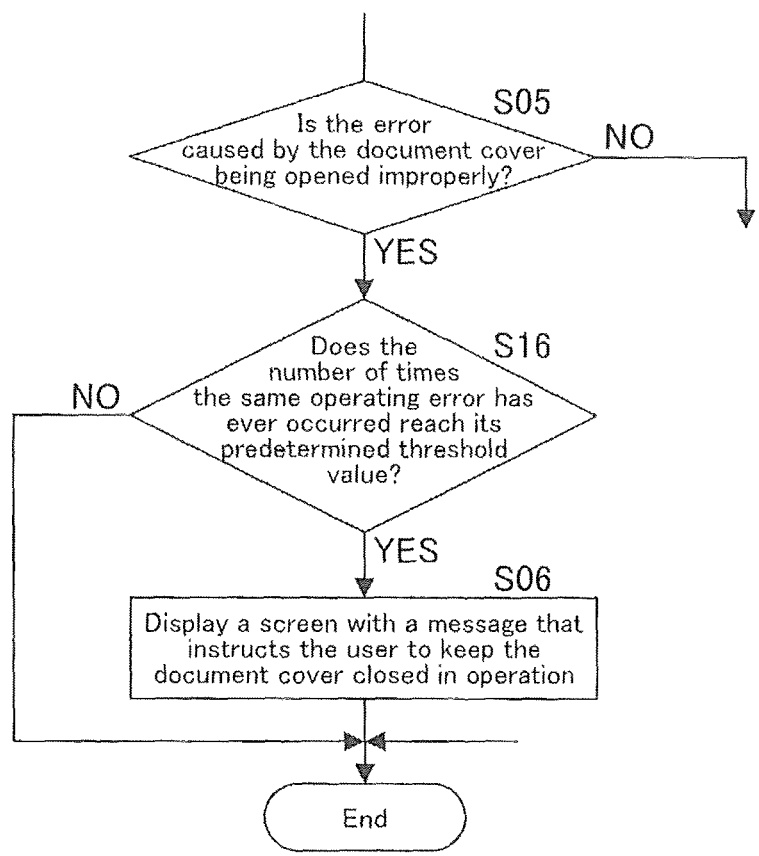
FIG. 17 is a flowchart representing another processing to be executed by the image forming apparatus when the image forming apparatus detects an operating error that is a document conveyance trouble on the document conveying device.

This embodiment may be configured as described below. If the operating error is caused by the document cover 200, for example, being opened while a document is being read (YES in Step S05 of the FIG. 10 flowchart), the CPU 11 then judges whether or not the number of times the same operating error has ever occurred reaches its predetermined threshold value, in Step S16 of the FIG. 17 flowchart. If that number does not reach its predetermined threshold value (NO in Step S16), the CPU 11 does not display a screen with a message that instructs the user to keep the document cover 200 closed in operation. If that number reaches its predetermined threshold value (YES in Step S16), the routine proceeds to Step S06, in which the CPU 11 displays a screen with a message that instructs the user to keep the document cover 200 closed in operation, on the display 171. Instead of the number of times the same operating error has ever occurred, the number of times the same operating error has ever occurred only successively may be used in this judgment step. The predetermined threshold value of the number of times the same operating error has ever occurred may be a fixed value regardless of the user or a different value depending on the user, whichever is more convenient. The steps omitted from the FIG. 17 flowchart are identical with those of the FIG. 10 flowchart.

In this configuration in which the number of times an operating error has ever occurred is used, the operating error is not caused only by the document cover 200 being opened while a document is being read as described above. The operating error may be caused by a door cover being opened while paper is being conveyed or may be caused by a document or paper being set in a wrong position.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image forming apparatus comprising:
   a display portion;
   an error sensor that detects an operating error;
   a recovery sensor that detects the recovery by a user from an operating error; and
   a display processor that makes the display portion display a notice of an operating error when the error sensor detects the operating error and that makes the display portion display an operation guide for preventing the reoccurrence of the same operating error when the recovery sensor detects the recovery from the operating error,
   wherein the operation guide is pre-stored in a non-volatile memory in the image forming apparatus.

2. The image forming apparatus according to claim 1, wherein, when the error sensor detects an operating error, the display processor makes the display portion display an operation guide for resolving the operating error together with a notice of the occurrence of the operating error.

3. The image forming apparatus according to claim 1, further comprising a document conveying device that feeds or conveys a document, wherein the operating error detected by the error sensor is a document feed or conveyance trouble on the document conveying device.

4. The image forming apparatus according to claim 1, further comprising a paper conveying device that feeds or conveys paper for image forming, wherein the operating error detected by the error sensor is a paper feed or conveyance trouble on the paper conveying device.

5. The image forming apparatus according to claim 3, wherein:
   the operating error detected by the error sensor is caused by document feed by the document conveying device, being stopped halfway through; and
   the display processor makes the display portion display a message as the operation guide for preventing the reoccurrence of the same operating error, the message instructing to set a document in a correct position.

6. The image forming apparatus according to claim 3, wherein:
   the operating error detected by the error sensor is caused by a document being stuck in a conveyance path of the document conveying device; and
   if the same operating error occurred in the last job, the display processor makes the display portion display a message as the operation guide for preventing the reoccurrence of the same operating error, the message instructing to confirm that no piece of a document remains in the conveyance path.

7. The image forming apparatus according to claim 3, further comprising:
   a document reader that obtains image data by reading a document image from the document, the document being conveyed by the document conveying device; and
   an error analyzer that identifies the cause of the operating error detected by the error sensor, by analyzing the image data obtained by the document reader, when the document is stuck in a conveyance path of the document conveying device,
   wherein, when the recovery sensor detects the recovery from the operating error, the display processor makes the display portion display an operation guide for preventing the reoccurrence of the same operating error, the same operating error whose cause is identified by the error analyzer.

8. The image forming apparatus according to claim 7, wherein
   the operating error is caused by the document being conveyed obliquely as a result obtained by the error analyzer; and
   the display processor makes the display portion display a message as the operation guide for preventing the reoccurrence of the same operating error, the message instructing to set a document in a correct position on the document conveying device.

9. The image forming apparatus according to claim 7, wherein
   the operating error is caused by successive pages of the document with a paper holder as a result obtained by the error analyzer; and
   the display processor makes the display portion display a message as the operation guide for preventing the reoccurrence of the same operating error, the message instructing to remove the paper holder and set the document.

10. The image forming apparatus according to claim 3, wherein
    the operating error detected by the error sensor is caused by a document cover being opened while the document is being fed or conveyed by the document conveying device; and
    the display processor makes the display portion display a message as the operation guide for preventing the reoccurrence of the same operating error, the message instructing to keep the document cover closed in operation.

11. The image forming apparatus according to claim 4, wherein
    the operating error detected by the error sensor is caused by paper feed by the paper conveying device, being stopped halfway through; and
    the display processor makes the display portion display a message as the operation guide for preventing the reoccurrence of the same operating error, the message instructing to set paper in a correct position.

12. The image forming apparatus according to claim 4, wherein:
the operating error detected by the error sensor is caused by the paper being stuck in a conveyance path of the paper conveying device; and
if the same operating error occurred in the last job, the display processor makes the display portion display a message as the operation guide for preventing the reoccurrence of the same operating error, the message instructing to confirm that no piece of paper remains in the conveyance path.

13. The image forming apparatus according to claim 4, wherein:
the operating error detected by the error sensor is caused by a door cover being opened bile the paper is being fed or conveyed by the paper conveying device; and
the display processor makes the display portion display a message as the operation guide for preventing the reoccurrence of the same operating error, the message instructing to keep any door cover closed in operation.

14. The image forming apparatus according to claim 1, wherein:
there is more than one the operating error detected by the error sensor at a time; and
the display processor makes the display portion display all operation guides for preventing the reoccurrence of the more than one operating error.

15. The image forming apparatus according to claim 1, wherein, if the number of times the operating error has ever been detected by the error sensor reaches its predetermined threshold value, the display processor makes the display portion display an operation guide for preventing the reoccurrence of the same operating error.

16. An error preventing method for an image forming apparatus, the error preventing method comprising:
detecting an operating error;
detecting the recovery by a user from an operating error; and
making a display portion display a notice of an operating error when the operating error is detected and making the display portion display an operation guide for preventing the reoccurrence of the same operating error when the recovery from the operating error is detected, wherein the operation guide is pre-stored in a non-volatile memory in the image forming apparatus.

17. A non-transitory computer-readable recording medium storing an error preventing program to make a computer of an image forming apparatus execute:
detecting an operating error;
detecting the recovery by a user from an operating error; and
making a display portion display a notice of an operating error when the operating error is detected and making the display portion display an operation guide for preventing the reoccurrence of the same operating error when the recovery from the operating error is detected, wherein the operation guide is pre-stored in a non-volatile memory in the image forming apparatus.

18. The image forming apparatus according to claim 1, wherein the display processor also makes the display portion display a screen with an operating guide for resolving the error upon detecting the error.

19. The method according to claim 16, wherein the display processor also makes the display portion display a screen with an operating guide for resolving the error upon detecting the error.

20. The non-transitory computer-readable recording medium according to claim 17, wherein the display processor also makes the display portion display a screen with an operating guide for resolving the error upon detecting the error.

* * * * *